United States Patent
Bhatia et al.

(10) Patent No.: US 9,384,109 B2
(45) Date of Patent: Jul. 5, 2016

(54) PROCESSOR WITH DEBUG PIPELINE

(71) Applicant: TEXAS INSTRUMENTS DEUTSCHLAND GMBH, Freising (DE)

(72) Inventors: Shrey Bhatia, Freising (DE); Christian Wiencke, Garching (DE); Armin Stingl, Erding (DE); Ralph Ledwa, Buching (DE); Wolfgang Lutsch, Freising (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 142 days.

(21) Appl. No.: 14/255,055

(22) Filed: Apr. 17, 2014

(65) Prior Publication Data

US 2015/0301915 A1 Oct. 22, 2015

(51) Int. Cl.
*G06F 11/00* (2006.01)
*G06F 11/273* (2006.01)
*G06F 11/36* (2006.01)
*G06F 11/34* (2006.01)

(52) U.S. Cl.
CPC ............ *G06F 11/273* (2013.01); *G06F 11/348* (2013.01); *G06F 11/3636* (2013.01); *G06F 11/3648* (2013.01); *G06F 11/3656* (2013.01); *G06F 11/3664* (2013.01)

(58) Field of Classification Search
CPC ............ G06F 11/3636; G06F 11/3648; G06F 11/3656; G06F 11/348; G06F 11/3664
See application file for complete search history.

(56) References Cited

U.S. PATENT DOCUMENTS

| 5,892,897 | A | * | 4/1999 | Carlson | G06F 11/1641 714/31 |
| 6,691,308 | B1 | * | 2/2004 | Kasper | G06F 9/268 712/211 |
| 7,793,261 | B1 | * | 9/2010 | Edwards | G06F 11/3656 717/124 |
| 2005/0005088 | A1 | * | 1/2005 | Yearsley | G06F 9/30123 712/235 |
| 2010/0023811 | A1 | * | 1/2010 | Moyer | G06F 11/3648 714/47.1 |
| 2014/0281735 | A1 | * | 9/2014 | Olivarez | G06F 11/2242 714/40 |

* cited by examiner

*Primary Examiner* — Charles Ehne
(74) *Attorney, Agent, or Firm* — John R. Pessetto; Frank D. Cimino

(57) ABSTRACT

A processor includes an execution pipeline that includes a plurality of execution stages, execution pipeline control logic, and a debug system. The execution pipeline control logic is configured to control flow of an instruction through the execution stages. The debug system includes a debug pipeline and debug pipeline control logic. The debug pipeline includes a plurality of debug stages. Each debug pipeline stage corresponds to an execution pipeline stage, and the total number of debug stages corresponds to the total number of execution stages. The debug pipeline control logic is coupled to the execution pipeline control logic. The debug pipeline control logic is configured to control flow through the debug stages of debug information associated with the instruction, and to advance the debug information into a next of the debug stages in correspondence with the execution pipeline control logic advancing the instruction into a corresponding stage of the execution pipeline.

16 Claims, 2 Drawing Sheets

PROCESSOR WITH DEBUG PIPELINE

BACKGROUND

Embedded software development and debugging using processors, such as microcontrollers, can be challenging. Accordingly, many processors include on-chip debug features to facilitate the software development process. Among the most fundamental debug features are program breakpoints. Program breakpoints allow the processor to be halted when software execution reaches a specific address. Once the processor is halted, a debug tool can examine the state of system memory and registers in the processor by issuing instructions to be executed on the processor through a debug protocol. Once the examination is completed, the debug tool can return the CPU to normal mode, and execution will continue until the next breakpoint. Some processors include circuitry to facilitate use of breakpoints. Such "hardware breakpoints" are non-intrusive, and have virtually no impact on software execution until the breakpoint triggers.

SUMMARY

A system and method for providing debugging in a processor with reduced energy consumption are disclosed herein. In one embodiment, a processor includes an execution pipeline, execution pipeline control logic, and a debug system. The execution pipeline includes a plurality of execution stages. The execution pipeline control logic is configured to control flow of an instruction through the execution stages. The debug system includes a debug pipeline and debug pipeline control logic. The debug pipeline includes a plurality of debug stages. Each of the debug pipeline stages corresponds to one of the execution pipeline stages, and a total number of the debug stages corresponds to a total number of the execution stages. The debug pipeline control logic is coupled to the execution pipeline control logic. The debug pipeline control logic is configured to control flow through the debug stages of debug information associated with the instruction, and to advance the debug information into a next of the debug stages in correspondence with the execution pipeline control logic advancing the instruction into a corresponding stage of the execution pipeline.

In another embodiment, a method includes providing an instruction to an initial stage of an execution pipeline of a processor. Concurrently with the providing of the instruction, debug information is provided to a debug pipeline of the processor. The debug pipeline is distinct from the execution pipeline and includes a same number of stages as the execution pipeline. The debug information propagates through the debug pipeline simultaneously with propagation of the instruction through the execution pipeline. Execution of the instruction is halted based on the debug information propagating into a predetermined stage of the debug pipeline.

In a further embodiment, a processor includes an execution power domain, a debug power domain, a debug tool detection circuit, an execution pipeline, and a debug system. The debug tool detection circuit is configured to: detect whether a debug tool is connected to the processor, and to enable power to the debug power domain responsive to detecting the debug tool connected to the processor. The execution pipeline includes a plurality of instruction execution stages disposed in the execution power domain. The debug system is disposed in the debug power domain. The debug system includes a debug pipeline that includes a plurality of debug stages. Each of the debug pipeline stages corresponds to one of the instruction execution stages, and a total number of the debug stages corresponds to a total number of the instruction execution stages. The debug pipeline is configured to advance the debug information into a next of the debug stages in correspondence with the execution pipeline advancing an instruction corresponding to the debug information into the corresponding stage of the execution pipeline.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
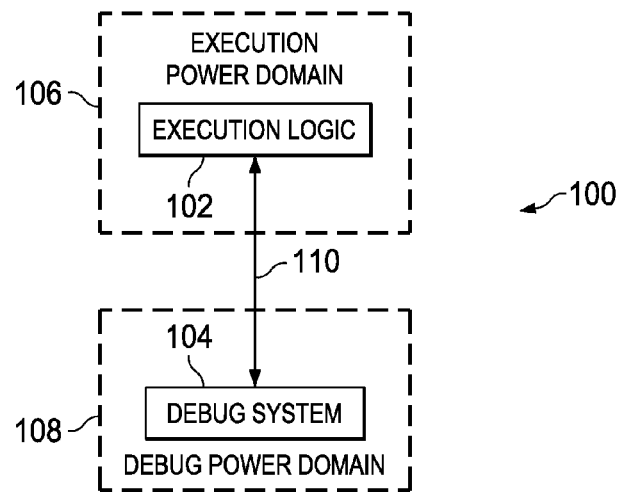
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Processor on-chip debugging systems that include hardware breakpoints, watchpoints and the like require that the processor include circuitry dedicated to the breakpoints and other debugging functions. In conventional processor on-chip debugging circuitry, the processor execution pipeline includes circuitry that allows instruction breakpoint information to propagate through the pipeline with the instruction until the instruction reaches a specified pipeline stage and the breakpoint information is applied to halt instruction execution. Because this additional debug circuitry is integrated into the processor's execution pipeline, the circuitry consumes energy whenever the processor is executing instructions, regardless of whether software is being debugged, thereby reducing processor power efficiency.

Embodiments of the present disclosure provide on-chip debugging that includes hardware breakpoints and the like with reduced energy consumption. The processor disclosed herein provides a debug pipeline that is separate from the processor's execution pipeline. Breakpoint information for an instruction propagates through the debug pipeline in lock-step with the propagation of the instruction through the execution pipeline. Because the debug pipeline is separate from the execution pipeline, the debug pipeline and other processor on-chip debugging features need only be powered during a debugging session. Accordingly, embodiments of the processor include separate and independent execution and debug power domains. Components located in the debug power domain, such the debug pipeline, debug address comparison logic, etc. are powered only during debugging, which reduces overall processor energy consumption in the vast majority of execution conditions, because software development time, during which debugging features are used, constitutes only a tiny fraction of overall processor operation time.

FIG. 1 shows a block diagram of a processor 100 in accordance with various embodiments. The processor 100 may be a general purpose microprocessor, a digital signal processor, a microcontroller, or other computing device that executes instructions retrieved from an instruction memory. The processor 100 includes execution logic 102 and a debug system 104. The execution logic 102 includes circuitry that executes instructions retrieved from memory. The debug system 104 is coupled to the execution logic 102. The debug system 104 includes logic that controls execution of instructions in the execution logic 102 to allow for debugging of instructions being executed by the execution logic 102. For example, the debug system 104 may halt execution of instructions by the execution logic 102 if the execution logic 102 executes an instruction retrieved from a particular memory address. Signals 110 exchanged by the execution logic 102 and the debug system 104 are applied to synchronize the operation of the execution logic and the debug system 104.

The processor 100 includes an execution power domain 106 and a debug power domain 108. The execution logic 102 is disposed in the execution power domain 106. The debug system 104 is disposed in the debug power domain 108. The debug power domain 108 is separate and distinct from the execution power domain 106. The execution power domain 106 is an area of the processor 100 that provides power to the execution logic 102 to allow the execution of instructions. Accordingly, the execution power domain 106 provides power whenever instructions are to be executed (e.g., when power is provided to the processor 100). The debug power domain 108 is an area of the processor 100 that provides power to the debug system 104 to allow debugging of an instruction stream being executed by the execution logic 102. The debug power domain 108 provides power only while the debug system 104 is being used to debug an instruction stream executed by the execution logic 102. Because the debug power domain 108 provides power to the debug system 104 only while debugging, the processor 100 uses less energy than a processor that includes debugging circuitry that is powered whenever the processor and/or the execution logic is powered. The processor 100 provides the debugging capabilities of a convention processor while consuming less energy than a conventional processor because the debug system 104 is only powered while debugging.

Figure 2:
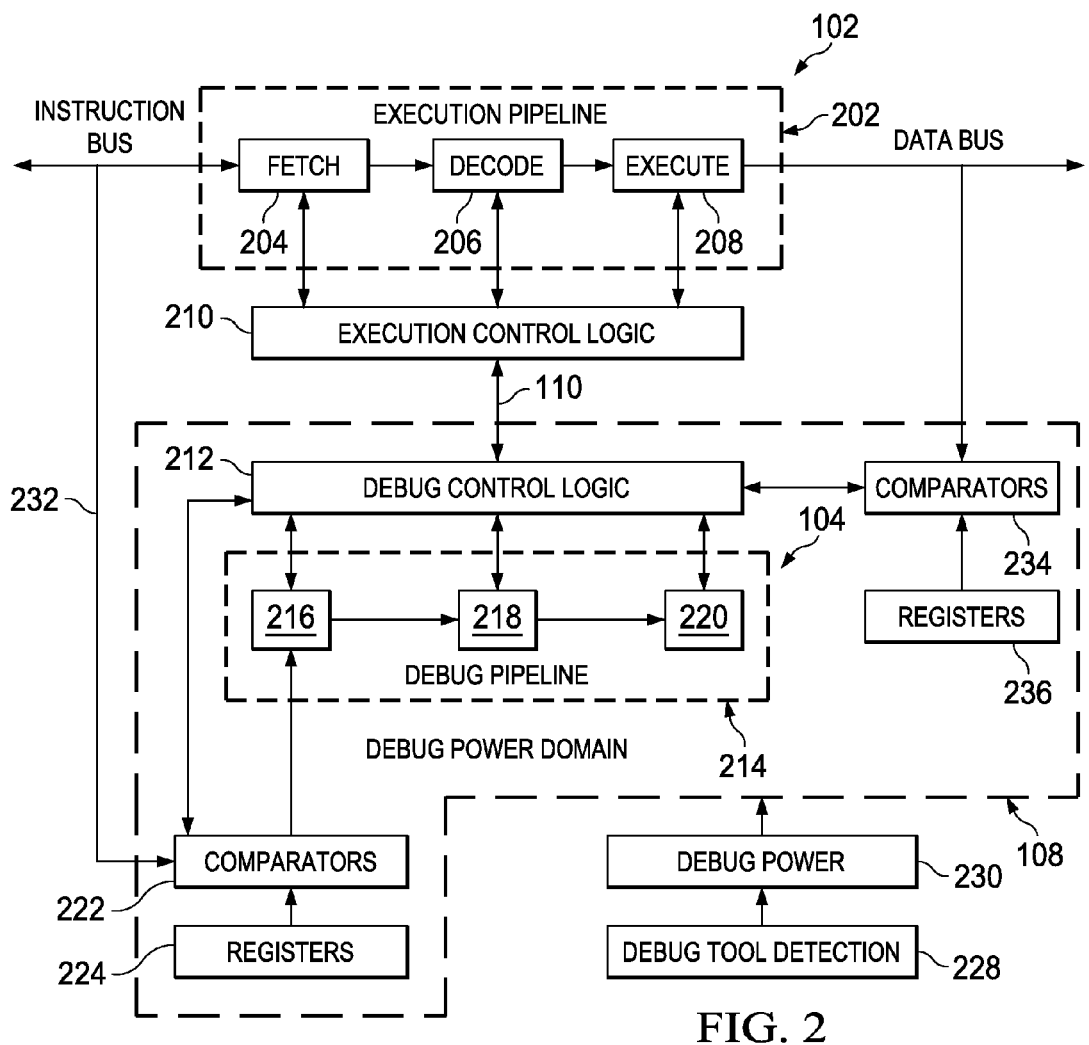
FIG. 2 shows a debug system in a processor in accordance with various embodiments.

FIG. 2 shows the processor debug system 104 and other subsystems of the processor 100 in greater detail. The execution logic 102 includes an execution pipeline 202 and execution pipeline control logic 210. The debug system 104 includes a debug pipeline 214, debug pipeline control logic 212, comparators 222 and registers 224. The processor 100 also includes debug tool detection circuitry 228 and debug power circuitry 230.

The execution pipeline 202 includes a plurality of execution stages 204, 206, 208 that incrementally execute an instruction. For example, the execution pipeline 202 may include a fetch stage 204, a decode stage 206, and an execute stage 208. Other embodiments may include different execution stages and/or a different number of execution stages.

The fetch stage 204 retrieves instructions from instruction memory for execution by the processor 100. The instruction memory is a storage device, such as a random access memory (volatile or non-volatile) that stores instructions to be executed. The instruction memory may an internal component of the processor 100, or alternatively may be external to the processor 100. The fetch stage 204 provides the retrieved instructions to the decode stage 206.

The decode stage 206 examines the instructions received from the fetch stage 204, and translates each instruction into controls suitable for operating the execute stage 208, processor registers, and other components of the processor 100 to perform operations that effectuate the instructions. The decode stage 206 provides control signals to the execute stage 208 that cause the execute stage 208 to carry out the operations needed to execute each instruction.

The execute stage 208 includes arithmetic circuitry, shifters, multipliers, registers, logical operation circuitry, etc. that are arranged to manipulate data values as specified by the control signals generated by the decode stage 206. Some embodiments of the processor 100 may include multiple execution pipelines 202 that provide the same or different data manipulation capabilities.

The execution control logic 210 controls the propagation of instructions through the execution stages of the execution pipeline 202. For example, if execution of a given instruction in the execute stage 208 requires a particular number of clock cycles, the execution control logic 210 may advance instructions in the execution pipeline 202 on expiration of the particular number of clock cycles.

The debug pipeline 214 includes a plurality of debug stages 216, 218, 220. The debug stages propagate debug information through the debug pipeline 214. The debug pipeline 214 has the same number of debug stages as the execution pipeline 202 has execution stages. Debug information in the debug pipeline 214 advances through the debug pipeline 214 in synchronization with the advancement of an instruction corresponding to the debug information through the execution pipeline 202.

The debug pipeline control logic 212 controls the propagation of the debug information through the stages 216-220 of the debug pipeline 214. The debug pipeline control logic 212 is coupled to the execution pipeline control logic 210. Signals 110 provided to the debug pipeline control logic 212 by the execution pipeline control logic 210 indicate when an instruction is propagating from stage to stage of the execution pipeline 212. Responsive to the signals 110, the debug pipeline control logic 212 causes debug information to advance through the debug pipeline 214 in lock-step with advancement of the instruction corresponding to the debug information through the execution pipeline 202. For example, when an instruction is retrieved into the fetch stage 204, debug information corresponding to the instruction is loaded into the debug stage 216. When the instruction advances from the fetch stage 204 to the decode stage 206, the debug information advances from debug stage 216 to debug stage 218. Similarly, when the instruction advances from the decode stage 206 to the execute stage 208, the debug information advances from debug stage 218 to debug stage 220. Advancement through the debug pipeline stages 216-220 is synchronized with advancement of the instruction through the execution pipeline stages 204-208 by the signals 110 provided to the debug pipeline control logic 212 by the execution pipeline control logic 210.

The registers 224 store memory addresses of instructions and/or data being used in debugging. For example, an instruction address stored in a selected register 224 may be a breakpoint address used to halt instruction execution in the execution pipeline 202 when an instruction at the address in the selected register 224 is executed, decoded, fetched, etc. Similarly, an address stored in a selected register 224 may be a watchpoint address used to halt instruction execution in the execution pipeline 202 when the address in the selected register 224 is accessed for reading or writing.

The registers 224 are coupled to the comparators 222. The comparators 222 compare the address values stored in the registers 224 to the instruction addresses driven onto the instruction bus 232 by the fetch stage 204. The instruction bus 232 conveys instructions and instruction addresses between instruction memory and the fetch stage 204. The output of comparators 222 is included in the debug information loaded into the debug pipeline 214 and propagated through the stages 216-220. When debug information indicating a positive address comparison propagates into a selected stage of the debug pipeline 214, the debug pipeline control logic 212 notifies the execution pipeline control logic 210, via signals 110, and the execution pipeline control logic 210 can halt execution of instructions in the execution pipeline 202.

The registers 236 store values of data used in debugging. For example, a data value stored in a selected register 236 may be used to halt instruction execution in the execution pipeline 202 when the data value is output by the execute stage 208.

The registers 236 are coupled to the comparators 234. The comparators 234 compare the data values stored in the registers 236 to the data values driven onto the data bus by the execution pipeline 202. The output of comparators 234 may be provided to a debug pipeline stage 216-220 corresponding to the execution pipeline stage 204-208 that performed the transaction associated with the data value. For example, if the execute stage 208 drives a data value onto the data bus for storage in a register of the processor 100, the output of the comparators 234 may be provided to debug pipeline stage 220.

Some embodiments of the processor 100 may include multiple instances of the execution pipeline 202, or a portion thereof. Such embodiments may include an instance of the debug pipeline 214 coupled to each instance of the execution pipeline 202 to provide debugging services with regard to instructions executing in the execution pipeline 202.

As explained above, the debug system 104 is powered only while software is being debugged. In some embodiments, the processor 100 detects whether a debug tool is connected to the processor 100, and controls provision of power to the debug system 104 based on whether a debug tool is connected to the processor 100. The debug tool detection circuitry 228 detects whether a debug tool is connected to the processor 100. The debug tool detection circuitry 228 may detect connection of a debug tool to the processor 100 by indentifying a clock signal generated by the debug tool and provided to the processor 100. In other embodiments, the debug tool detection circuitry 228 may detect connection of a debug tool by a different method. The debug tool detection circuitry 228 provides a signal indicating whether a debug tool is connected to the processor 100 to the debug power circuitry 230. The debug power circuitry 230 switches power to the debug system 104 (i.e., the debug power domain 108) when the debug tool detection circuitry 228 indicates that a debug tool is connected to the processor 100, and disconnects power from the debug power system 104 when the debug tool detection circuitry 228 indicates that the debug tool is not connected to the processor 100. An execution power system powers the execution logic 102 independently of the debug system 104.

Figure 3:
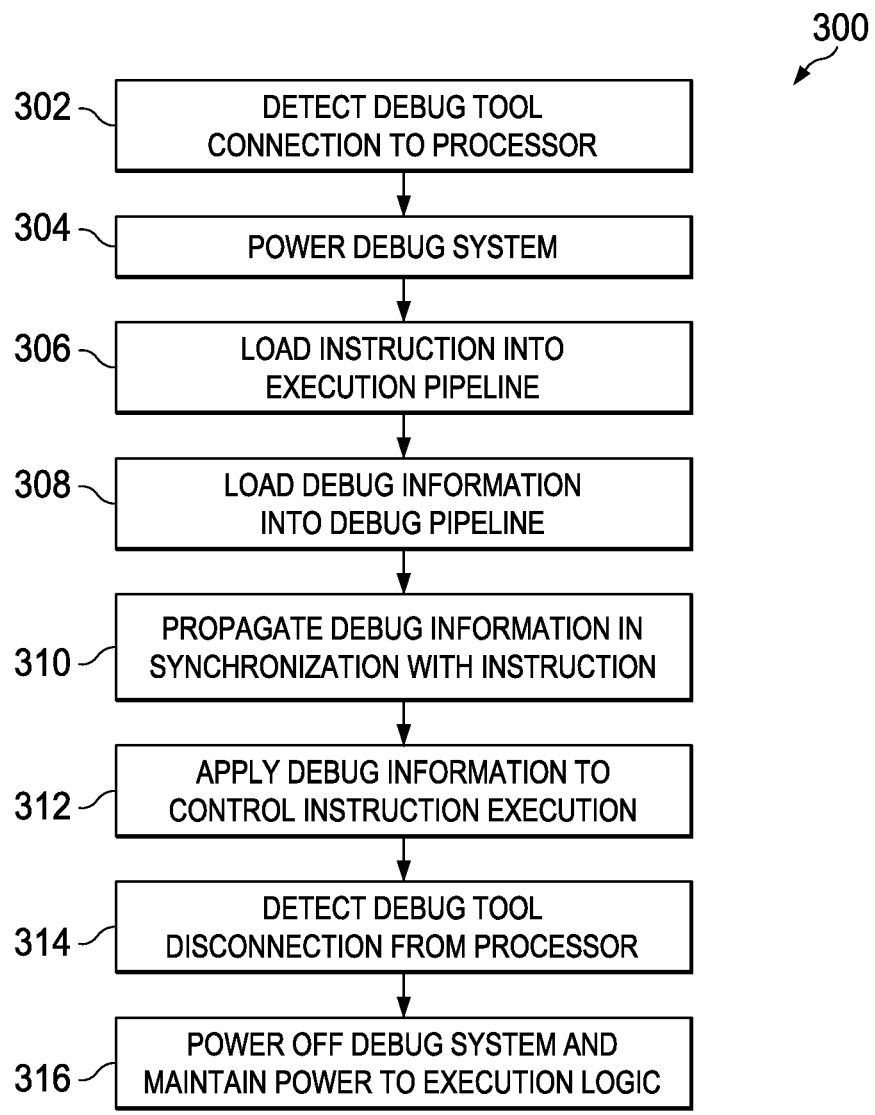
FIG. 3 shows a flow diagram for a method for debugging in accordance with various embodiments.

FIG. 3 shows a flow diagram for a method 300 for debugging in a processor in accordance with various embodiments. Though depicted sequentially as a matter of convenience, at least some of the actions shown can be performed in a different order and/or performed in parallel. Additionally, some embodiments may perform only some of the actions shown.

In block 302, the processor 100 is powered, the execution logic 102 is powered, and the debug system 104 is not powered because a debug tool is not connected to the processor 100. The debug tool detection circuitry 228 is monitoring a debug tool port of the processor 100 to determine whether a debug tool is connected to the processor 100.

In block 304, the debug tool detection circuitry 228 detects connection of a debug tool to the processor 100, and in response to detection of connection of the debug tool, power is switched to the debug system 104 and the debug system 104 is enabled to provide debugging functionality.

In block 306, the processor 100 is executing instructions. As an instruction is loaded into the execution pipeline 202 to be executed in block 306, debug information corresponding to the instruction is loaded into the debug pipeline 214 in block 308. The debug information may indicate whether an address of the instruction or of data accessed by the instruction corresponds to an address stored in the registers 224.

In block 310, the debug information is propagated through the debug pipeline 214 in synchronization with propagation of the corresponding instruction through the execution pipeline 202.

In block 312, the processor 100 applies the debug information in the debug pipeline 214 to control instruction execution in the execution pipeline 202. For example, propagation of the debug information to a given stage of the debug pipeline 214 may halt execution of instructions in the execution pipeline 202.

In block 314, the debug tool detection circuitry 228 is monitoring the debug tool port of the processor 100, and determines that the debug tool has been disconnected from the processor 100.

In block 316, responsive to detection of the disconnection of the debug tool, power is disconnected from the debug system 104. Power to the execution logic 102 is independent of power to the debug system 104. Accordingly, when power is disconnected from the debug system 104, the execution logic 102 remains powered and may execute instructions while the debug system 104 is unpowered.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   an execution pipeline comprising a plurality of execution stages;
   execution pipeline control logic configured to control flow of an instruction through the execution stages; and
   a debug system, comprising:
   a debug pipeline comprising a plurality of debug stages, wherein each of the debug pipeline stages corresponds to one of the execution pipeline stages, and a total number of the debug stages corresponds to a total number of the execution stages;
debug pipeline control logic coupled to the execution pipeline control logic, the debug pipeline control logic configured to:
control flow through the debug stages of debug information associated with the instruction;
advance the debug information into a next of the debug stages in correspondence with the execution pipeline control logic advancing the instruction into a corresponding stage of the execution pipeline;
wherein the debug information comprises at least one of breakpoint information and watchpoint information.

2. A processor, comprising:
an execution pipeline comprising a plurality of execution stages;
execution pipeline control logic configured to control flow of an instruction through the execution stages; and
a debug system, comprising:
a debug pipeline comprising a plurality of debug stages, wherein each of the debug pipeline stages corresponds to one of the execution pipeline stages, and a total number of the debug stages corresponds to a total number of the execution stages;
debug pipeline control logic coupled to the execution pipeline control logic, the debug pipeline control logic configured to:
control flow through the debug stages of debug information associated with the instruction;
advance the debug information into a next of the debug stages in correspondence with the execution pipeline control logic advancing the instruction into a corresponding stage of the execution pipeline;
further comprising debug power circuitry configured to:
power on the debug system based on an external debug tool being connected to the processor; and
power down the debug system based on an external debug tool not being connected to the processor.

3. The processor of claim 2, further comprising debug tool detection circuitry configured to determine whether the debug tool is connected to the processor and provide a signal to the debug power system indicating whether the debug tool is connected to the processor.

4. The processor of claim 2, further comprising an execution power system configured to power the execution pipeline independently of the debug system.

5. A processor, comprising:
an execution pipeline comprising a plurality of execution stages;
execution pipeline control logic configured to control flow of an instruction through the execution stages; and
a debug system, comprising:
a debug pipeline comprising a plurality of debug stages, wherein each of the debug pipeline stages corresponds to one of the execution pipeline stages, and a total number of the debug stages corresponds to a total number of the execution stages;
debug pipeline control logic coupled to the execution pipeline control logic, the debug pipeline control logic configured to:
control flow through the debug stages of debug information associated with the instruction;
advance the debug information into a next of the debug stages in correspondence with the execution pipeline control logic advancing the instruction into a corresponding stage of the execution pipeline;
wherein the debug system further comprises:
a register to store an address of an instruction or memory location to accessed;
a comparator to compare the address stored in the register to an address of an instruction or memory access provided by the execution pipeline;
wherein an output signal of the comparator is provided to an initial stage of the debug pipeline as at least a portion of the debug information.

6. A method, comprising:
providing an instruction to an initial stage of an execution pipeline of a processor;
providing, concurrently with the providing of the instruction, debug information to a debug pipeline of the processor, wherein the debug pipeline is distinct from the execution pipeline and includes a same number of stages as the execution pipeline;
propagating the debug information through the debug pipeline simultaneously with propagation of the instruction through the execution pipeline;
halting execution of the instruction based on the debug information propagating into a predetermined stage of the debug pipeline;
further comprising:
detecting connection of a debug tool to the processor; and
supplying power to the debug pipeline responsive to the detecting of the connection.

7. The method of claim 6, further comprising:
detecting disconnection of the debug tool from the processor; and
removing power from the debug pipeline responsive to the detecting of the disconnection.

8. The method of claim 6, further comprising supplying power to the execution pipeline without respect to whether the debug tool is connected to the processor.

9. The method of claim 6 further comprising:
comparing, via a comparator coupled to the debug pipeline, an address value generated by the execution pipeline to an address value stored in a register coupled to the comparator;
providing a result of the comparing to an initial stage of the debug pipeline, wherein the result of the comparing is included in the debug information;
supplying power to the comparator and the register responsive to the detecting of the connection.

10. A method, comprising:
providing an instruction to an initial stage of an execution pipeline of a processor;
providing, concurrently with the providing of the instruction, debug information to a debug pipeline of the processor, wherein the debug pipeline is distinct from the execution pipeline and includes a same number of stages as the execution pipeline;
propagating the debug information through the debug pipeline simultaneously with propagation of the instruction through the execution pipeline;
halting execution of the instruction based on the debug information propagating into a predetermined stage of the debug pipeline;
wherein the debug information comprises at least one of breakpoint information and watchpoint information.

11. A processor, comprising:
an execution power domain;
a debug power domain;
a debug tool detection circuit configured to:

detect whether a debug tool is connected to the processor; and enable power to the debug power domain responsive to detecting the debug tool connected to the processor;

an execution pipeline comprising a plurality of instruction execution stages disposed in the execution power domain; and a debug system disposed in the debug power domain, the debug system comprising:

a debug pipeline comprising a plurality of debug stages, wherein each of the debug pipeline stages corresponds to one of the instruction execution stages, and a total number of the debug stages corresponds to a total number of the instruction execution stages;

wherein the debug pipeline is configured to advance the debug information into a next of the debug stages in correspondence with the execution pipeline advancing an instruction corresponding to the debug information into the corresponding stage of the execution pipeline.

12. The processor of claim 11, wherein the debug information comprises at least one of breakpoint information and watchpoint information.

13. The processor of claim 11, wherein the debug tool detection circuit is configured to disable power from the debug power domain responsive to detecting the debug tool disconnected from the processor.

14. The processor of claim 11, wherein the execution power domain is configured to power the execution pipeline independently of whether power is enabled to the debug power domain.

15. The processor of claim 11, wherein the debug system further comprises:

a register to store an address of an instruction or memory location to accessed;

a comparator to compare the address stored in the register to an address of instruction or memory access provided by the execution pipeline;

wherein the comparator is to provide an output signal to an initial stage of the debug pipeline as at least a portion of the debug information.

16. The processor of claim 11, further comprising:

a plurality of instances of the execution pipeline disposed in the execution power domain; and wherein the debug system comprises a plurality of instances of the debug pipeline;

wherein each instance of the debug pipeline corresponds to an instance of the execution pipeline, and debug information propagates through each instance of the debug pipeline in synchronization with propagation of an instruction corresponding to the debug information through the corresponding instance of the execution pipeline.

* * * * *